United States Patent [19]

Chung

[11] Patent Number: 5,002,806
[45] Date of Patent: Mar. 26, 1991

[54] CURATIVE FOR STRUCTURAL URETHANE ADHESIVE

[75] Inventor: Daniel A. Chung, Dublin, Ohio

[73] Assignee: Ashland Oil, Inc., Russell, Ky.

[21] Appl. No.: 463,099

[22] Filed: Jan. 11, 1990

[51] Int. Cl.$^5$ .............................................. C08G 18/32
[52] U.S. Cl. ............................. 427/385.5; 156/331.4; 156/331.7; 252/182.26; 427/322; 428/423.1; 428/423.7; 428/425.6; 528/60; 528/62; 528/64; 528/76; 528/77
[58] Field of Search ............................. 427/385.5, 322; 252/182.26; 156/331.4, 331.7; 428/423.1, 423.7, 425.6; 528/60, 62, 64, 76, 77

[56] References Cited

U.S. PATENT DOCUMENTS

| | | | |
|---|---|---|---|
| 3,647,513 | 3/1972 | Jackson | 117/47 A |
| 3,812,003 | 5/1974 | Larson | 161/156 |
| 3,935,051 | 1/1976 | Bender | 156/331 |
| 4,004,050 | 1/1977 | Rabito | 427/302 |
| 4,097,442 | 6/1978 | Kieft | 260/37 N |
| 4,247,676 | 1/1981 | Kimball | 528/49 |
| 4,330,454 | 5/1982 | Kimball | 524/773 |
| 4,373,082 | 2/1983 | Kimball | 528/60 |
| 4,444,976 | 4/1984 | Rabito | 528/60 |
| 4,552,934 | 11/1985 | Rabito | 525/458 |
| 4,753,751 | 6/1988 | Rogers | 252/182.17 |

Primary Examiner—Maurice J. Welsh
Attorney, Agent, or Firm—Mary E. Picken

[57] ABSTRACT

A curative for a two part structural primerless urethane adhesive for fiberglass reinforced polyester substrates curable at 240° F. (116° C.).

26 Claims, No Drawings

CURATIVE FOR STRUCTURAL URETHANE ADHESIVE

This invention relates to curatives for primerless structural polyurethane adhesives for bonding fiberglass reinforced polyester parts used in the manufacture of cars, trucks and boats.

BACKGROUND OF THE INVENTION

Typically, polyurethane adhesives are made by combining a prepolymer component with a curative component just before use. The adhesive is then applied to a car part made of fiberglass reinforced polyester (FRP) and a second part is placed over the adhesive. The adhesive is then cured by placing the adhered parts in an oven maintained at 300° F. (150° C.) for 30 minutes to cure or harden the adhesive.

In order to be commercially useful a structural polyurethane adhesive must demonstrate a number of physical properties. The best adhesives of this type are: primerless, non-sag, have a long open time, cure at lower temperatures than 300° F. (150° C.), and are so strong that, when bonds are broken, the substrate delaminates or fails before the adhesive itself fails.

Although primers are usually used to treat the substrates before applying polyurethane adhesives, it is better to eliminate the primer step if possible because primers often contain chlorinated hydrocarbons and because eliminating any single step in a multiple step process is an improvement.

Often the adhesive must be applied to a substrate in a vertical position where, if the adhesive is too fluid, it will drip or sag before the second substrate can be placed over the adhesive. Thus, an adhesive which does not sag is preferred. This property is known as "non-sag" and is measured by noting the distance the adhesive flows at the end of a period of time such as three minutes. The test method used to measure sag is ASTM D2202-84. Instead of a cylindrical cavity used for the test in ASTM D2202-84, sometimes a bead cavity of 0.95 cm wide × 7.64 cm long and 0.63 cm deep is used to sample the adhesive. In this case, the results are called bead sag, to differentiate from the button sag results of the unmodified test.

It is important that an adhesive remain uncured and fluid for sufficient time to permit placing of the second substrate onto the adhesive. An adhesive which hardens too quickly does not permit flexibility in the assembly line process. Thus, the length of time the adhesive is fluid is measured and is referred to as "open time".

If an adhesive requiring 300° F. (150° C.) cure could be replaced by a strong adhesive curing at 240° F. (116° C.), this lower temperature cure will save energy and permit lower temperature bake cycles of the subsequent painting step.

The most preferred adhesives for FRP will be curable at 240° F. (116° C.) and will show a failure of the substrate at 180° F. when force is applied to separate the adhered parts. When the adhesive itself fractures the result is called "adhesive failure" (AF). When the substrate itself breaks the result is called "delamination" (DL). When an adhesive is said to have exhibited 100% substrate delamination the entire broken interface between adhesive and substrate shows only the torn fibers and disrupted structure of the substrate itself.

Previously these polyurethane structural adhesives have been cured by baking at least at 300° F. (150° C.) for 30 minutes. These adhesives usually required the use of a primer and consisted of two parts: an isocyanate terminated prepolymer and a curative made from a polyether polyol, a diamine and an optional catalyst. When the automobile industry demanded adhesives curing at lower temperatures so as to save energy it was necessary to develop new adhesive chemistry because these conventional adhesives, curable only at 300° F. (150° C.) could not show adequate substrate delamination at 180° F. (82° C.) after curing at 240° F. (116° C.) for an hour. New adhesive chemistry also had to be useful on substrates in any environment all year including humid conditions. Such adhesives are said to be "water resistant".

OBJECT OF THE INVENTION

It is therefore an object of this invention to provide a curative for a primerless structural polyurethane adhesive curable at 240° F. (116° C.) in 60 minutes. This adhesive should not sag more than 0.5 inch in either the button sag test or in the bead sag test within a period of three minutes. The open time interval during which the second substrate can be applied should be within the useful period of from 5 to 40 minutes. This adhesive should show substrate delamination when tested at temperatures ranging from −30° F. to 180° F.

BROAD STATEMENT OF THE INVENTION

The present invention is a curative component of a primerless polyurethane structural adhesive for fiberglass reinforced polyester (FRP) or sheet molding compound (SMC) and other reinforced plastic substrates or metal.

The curative of the invention is used in conjunction with a conventional isocyanate terminated prepolymer. The curative demonstrates, when combined with the prepolymer, excellent non-sag behavior and long open time. After curing at 240° F. (116° C.) the adhesive delaminates the FRP substrate in a test such as the lap shear test at 180° F. (82° C.), ASTM method D1002. The curative of this invention is a mixture of a polyol, the combination of a slow reacting diamine and a fast diamine and an optional catalyst. From 0.02 to 0.18 equivalent per equivalent of curative of slow reacting diamine is used in the curative in combination with from 0.04 to 0.14 equivalent per equivalent of curative of fast reacting diamine.

This invention also is a method of laminating a first fiberglass reinforced plastic substrate and a second substrate comprising the steps of cleaning said first substrate, applying an adhesive made by mixing an isocyanate terminated prepolymer and a curative comprising a polyol, the combination of a fast reacting diamine or polyamine and a slow reacting diamine or polyamine and an optional catalyst, affixing said second substrate and curing said laminate.

This invention is also a laminated composite of a first unprimed fiber reinforced polyester substrate and a second substrate adhesively bound thereto by the cured residue of an adhesive which is the blend of an isocyanate terminated polyol prepolymer and a curative which is the mixture of a polyol and the combination of a slow reacting diamine or polyamine and a fast reacting diamine or polyamine and an optional catalyst.

The prepolymer with which the curative of this invention is used is the reaction product of a polyol and an aromatic isocyanate. Among the useful prepolymers are those described in copending U.S. patent application Ser. No. 07/087,194 of 08/20/87 filing date.

The curative of this invention, in combination with an isocyanate terminated prepolymer, forms an adhesive which is particularly well adapted for use on fiberglass reinforced polyester substrates. These substrates are made from, typically, the reaction product of dipropylene glycol, maleic anhydride, high molecular weight polyvinyl acetate, styrene, peroxide polymerization initiator and fillers.

The adhesive is adaptable for use on a variety of other plastics such as reaction injection molding (RIM) polyurethanes, acrylonitrile-butadiene-styrene (ABS) terpolymers, styrene acrylonitrile copolymers (SAN), thermoplastic polyolefins (TPO) and thermoplastic alloys such as polycarbonate-polyester blends and polycarbonate-ABS blends. Among the useful fibers used in reinforcing the substrates are fiberglass, graphite and Kevlar polyamide fiber. Steel substrates may also be adhered using the curative of this invention mixed with a prepolymer.

Among the fiberglass reinforced polyester substrates useful in the practice of this invention are those provided by GenCorp, Marion, Ind. (GC-7113, GC-8002 and GC-7101 substrates), Rockwell International Corporation, Centralia, Ill. (RW 9468 Substrate), Budd Company, Madison Heights, Mich. (DSM 950 Substrate) and Eagle Picher Plastics, Grabill, Ind. (EP SLI-223-1 Substrate).

The curative of this invention is a mixture of a polyol, the combination of a slow reacting diamine or polyamine and a fast reacting diamine or polyamine, an optional urethane catalyst and an optional thickening agent.

The first ingredient of the curative is a polyether polyol having a functionality of 1.8 to 6.0 and a hydroxyl number from 100 to 1200. A hydroxyl number range of 200 to 700 and a functionality range of 3 to 5 are preferred. Suitable active hydrogen containing materials include diols, triols and tetrols, having primary, secondary and/or tertiary alcohol groups. Among the preferred polyether polyols are: Pluracol PeP 550 polyol, a propoxylated derivative of pentaerythritol having four secondary hydroxyl groups, a hydroxyl number of 450, and a molecular weight of 500 available from BASF Wyandotte Corporation, Parsippany, N.J.; Pluracol P-355 polyol, an ethoxylated/propoxylated derivative of ethylene diamine having about 80% of its hydroxyl groups as primary and having a hydroxyl number of 450, also available from BASF. Wyandotte Corporation; Thanol R470X polyol, available from Texaco Chemical Co., Bellaire, Tex., a propoxylated derivative of diethanolamine with a functionality of about 4 and a hydroxyl number of 500; Thanol SF-265 polyol, also available from Texaco Chemical Co., a propoxylated derivative of triethanolamine with a functionality of about 3 and a hydroxyl number of 600; Voranol 230-660 polyol, a polyether triol of 85.4 equivalent weight based on the propoxylation of glycerin, available from Dow Chemical Co., Midland Mich.; and Dianol 2210 polyol, an ethoxylated derivative of bisphenol-A with a functionality of 2 and a hydroxyl number of 280, available from Akzo Chemie America, Chicago, Ill.

The second component of the curative of this invention is a combination of a slow reacting diamine or polyamine and a fast reacting diamine or polyamine. The slow reacting diamines and polyamines contain amine groups which react slowly with the isocyanate groups of the prepolymer because the amine groups are part of aromatic structures or are sterically hindered. Sterically hindered primary and secondary diamine compounds useful in this invention include those having hydrocarbon radicals of up to about 16 carbon atoms (R') either:

(1) Attached to the carbon atoms adjacent to the nitrogen atoms:

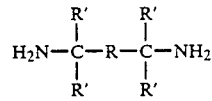

where R may include hydrocarbon groups, which may also contain oxygen, nitrogen, sulfur or halogen, or (2) Attached to the nitrogen atoms and attached to the carbon atoms adjacent to the nitrogen atoms:

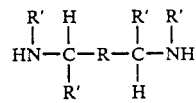

where R may include hydrocarbon groups which may also contain oxygen, nitrogen, sulfur or halogen, or (3) Attached to the nitrogen atoms and to the carbon atoms adjacent to the nitrogen atom:

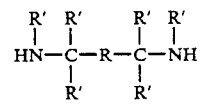

where R may include hydrocarbon groups which may also contain oxygen, nitrogen, sulfur or halogen.

Among the numerous slow reacting diamines useful in this invention are the following aromatic diamines:
toluene diamine
1-methyl-3,5-diethyl-2,4-diaminobenzene
1-methyl-3,5-diethyl-2,6-diaminobenzene (also known as DETDA or diethyl toluene diamine)
di(methylthio) toluene diamine
1,3,5-triethyl-2,6-diaminobenzene
toluene diamine derivatives containing halogen groups, cyano groups, alkoxy, alkylthio, alkenyl or carbonylic moieties
m-phenylene diamine
p-phenylene diamine
4',4'-methylenedianiline
4,4'-diaminodiphenyl sulfone
2,6-diamino-pyridine
4, 4'-methylene bis(3-chloroaniline)
4, 4'-methylene bis (3-chloro-2,6-diethylaniline)
4,4-methylene bis (3-chlor-2.5-diethylaniline
3,3'-di-isopropyl-4,4'-diaminodiphenylmethane
3,5,3', 5'-tetraethyl-4,4'-diaminodiphenylmethane
propylene-di-4-aminobenzoate
isobutyl 4-chloro-3,5-diaminobenzoate
bis (2-aminophenyl) disulfide
bis (4-aminophenyl)disulfide
3,3'-carbomethoxy-4,4'-diamino diphenylmethane, and mixtures thereof Among the slow reacting diamines which are sterically hindered diamines are:
0 1,8 diamino-p-menthane α, α, α', α' tetramethyl xylene diamine
N, N'-ditertiary-butylethylene diamine and mixtures thereof The preferred slow reacting aromatic diamines are diethyl toluene diamine (DETDA ETHACURE 100) and di(methylthio) toluene diamine, (ETHACURE 300) both available from Ethyl Corporation, Baton Rouge, La.

The above described slow reacting diamines must, in the curative of this invention, be used in combination with fast reacting diamines or polyamines. These diamines are aliphatic or cycloaliphatic diamines or polyamines whose amine groups react quickly with the isocyanate groups of the prepolymer used, in conjunction with the curative of this invention, to form a urethane adhesive curable at 240° F. (116° C.). Among the numerous fast reacting diamines used in combination with slow reacting diamines in the curative of this invention are:
dimethylethylene diamine
diethylethylene diamine
dimethyl propylene diamine
diethyl propylene diamine
pentaethylene hexamine
N, N'-dialkyl-alkylene diamines where the total number of carbon atoms is 20.
primary and secondary amine terminated polyether polyols of 100–10,000 molecular weight having 2–6 functionality preferably from 2 to 3. Commercial products meeting this description include the Jeffamine diamines from Texaco Chemical Co., Houston, Tex. and Polamine 650 and Polamine 1000 from Polaroid Corporation, Assonet, Mass.
hydrazine
ethylene diamine
propylene diamine
butylene diamine
hexane diamine
isophorone diamine
dicyclohexylmethane diamine
cyclohexane diamine
pentaethylene hexamine
piperazine
2-methylpentamethylene diamine
1,12-dodecane diamine
bis-hexamethylene diamine
and mixtures thereof The preferred fast reacting diamines used in combination with a slow reacting diamine in the curative of this invention are isophorone diamine available from Huls Nuodex Inc., Piscataway, N.J. and piperazine available from Texaco, Inc., New York, N.Y. The most preferred fast reacting diamine is piperazine.

The proportion of equivalents of slow and fast reacting diamines and their concentration in the total equivalents of curative are important to the invention. It is preferred that from 0.02 to 0.18 equivalent of slow reacting diamine per equivalent of curative be present in combination with from 0.04 to 0.14 equivalent of fast reacting diamine per equivalent of curative. The most preferred combination of diamines in the curative of this invention is 0.06 equivalent of slow reacting diamine and 0.11 equivalent of fast reacting diamine per equivalent of curative.

The third ingredient of the curative component is an optional catalyst to facilitate the reaction between active hydrogen containing compounds and isocyanates. Suitable tertiary amine catalysts include N,N',N''-dimethylaminopropylhexahydrotriazine (Polycat 41) and 1,4-diazabicyclooctane, and suitable metallic catalysts include dibutyltin dilaurate, dibutyltin diacetate, ferric acetyl acetonate, nickel acetylacetonate, dibutyltin dialkyl acid, stannous octoate, dibutyltin diiso-octyl mercapto acetate, dibutyl tin diisooctyl maleate, and mixtures of these catalysts. The preferred organo metallic catalyst is the dibutyltin dialkyl acid catalyst known as DABCO 125 catalyst available from Air Products, Allentown, Pa. The preferred tertiary amine catalyst is N, N', N''-dimethylaminopropyl- hexahydrotriazine. Conventional catalytic amounts of either organotin catalyst or tertiary amine catalyst or combinations thereof are optionally used in the curative of this invention. From about 0.1 part by weight to 1.0 part by weight organotin catalyst and from about 0.3 part by weight to about 3.0 parts by weight amine catalyst are optionally used in 100 parts adhesive.

The preferred optional thickening agents are fumed silica available as Aerosil 200 or Aerosil R972 fumed silica from Degussa Inc., New York, N.Y.; and Hydrite RH thickener, a surface modified kaolinite (hydrated aluminum silicate) from Georgia Kaolin Company, Union, N.J.

Small amounts of other optional materials may also be added to the curative. These include coloring agents, for example, Stantone HCCC. 6783 green coloring agent from Harwick Chemical Company, Akron, Ohio, which is a blend of C.I. Pigment Green #7 and C.I. Pigment Black #7 dispersed in a polyoxypropylene polyol at 17.8 parts of pigment to 82.2 parts polyol. From 1.5 to 3.0 percent of a polyisocyanate such as toluene diisocyanate, 4,4'-methylene diphenyldiisocyanate, or xylylene diisocyanate may also optionally be included in the curative.

It may be desirable to use from 1.0 to 30.0 percent of a drying agent such as a molecular sieve in either the prepolymer or curative (or both). One useful molecular sieve is the 5 Angstrom size available from Union Carbide.

The prepolymer and curative are generally used at a ratio of 4–5 parts by weight prepolymer to 1 part by weight curative.

The curative of this invention is prepared by mixing polyols of different molecular weights and then adding the combination of slow reacting diamine and fast reacting diamine and optional catalyst. The curative is provided to the customer as one part of a two part system. A prepolymer is provided as the other part of the two part system.

Usually the prepolymer used with the curative of this invention is prepared by reacting excess aromatic polyisocyanate with polyol.

The customer combines the prepolymer blend pack with the curative pack in the desired ratio, usually 4–5 weight parts prepolymer is blended with 1 weight part curative. A static mixer may be used. The adhesive is applied to the first substrate by conventional means. The second substrate is then laminated over the first adhesive coated substrate. The adhesive is cured either at room temperature or by heating to 240° F. (116° C.) for 60 minutes.

The nature and advantage of this invention can be more readily seen and appreciated by reference to the following representative examples where all parts and percentages are by weight unless otherwise indicated. Also, all references cited herein are expressly incorporated herein by reference.

EXAMPLE A

This Example A which is outside the scope of this invention describes the preparation of a typical prepolymer. A prepolymer was made by adding, with a nitrogen purge, 40.38 parts of polypropylene oxide ether diol of 2000 molecular weight (Olin Poly-G 20-56 polyol, Olin Chemicals, Stamford, Conn.) followed by 20.0 parts dry Mistron RCS talc (Cyprus Industrial Minerals Company, Los Angeles, Calif.) and 0.40 part Irganox 1010 antioxidant with stirring and heating at 100° to 110° C. The wetted mix was sheared at high speed in vacuum for 60 minutes. Then 5.0 parts Molecular Sieves powder 5A (Union Carbide, Tarrytown, N.Y.) and 32.22 parts of Mondur MRS isocyanate were added. The components were allowed to react under vacuum at 82°±2° C. until the isocyanate content reached the theoretical value of 8.6%. The prepolymer was cooled to 40°±5° C. and 2.0 parts m-xylylene diisocyanate was added. The finished product was transferred to a bucket and sealed under a nitrogen atmosphere. The viscosity was 28,000±5000 centipoise at 25° C.

EXAMPLE B

This Example B describes the preparation of another typical prepolymer component. A prepolymer was made by adding, with a nitrogen purge, 100.00 parts of polypropylene oxide ether diol of 2000 molecular weight (Olin Poly-G 20-56 polyol, Olin Chemicals, Stamford, Conn.) followed by 39.92 parts dry Mistron RCS talc (Cyprus Industrial Minerals Company, Los Angeles, Calif.) with stirring and heating at 100° to 110° C. The wetted mix was dried by vacuum heating at 26 inches mercury (30 inches mercury being full vacuum on the production gauge). Then, 15.00 parts Molecular Sieves 5A was added, followed by the addition of a mixture of 30.90 parts of Mondur MRS isocyanate and 54.19 parts of Isonate 143L isocyanate. The components were allowed to react under vacuum at 80°-90° C. until the isocyanate content reached the theoretical value of 8.6%. Two last components of 0.081 parts of zinc stearate and 6.00 parts isophoronediisocyanate were then added. After about ten minutes of mixing the prepolymer was discharged. The finished product was transferred to a bucket and sealed under a nitrogen atmosphere. The viscosity was 18,000±7,000 centipoise at 25° C.

EXAMPLE 1

This Example 1 describes the preparation of the curative of this invention. A curative was prepared by charging, under an inert gas (nitrogen or argon) blanket, 33.2 parts Pluracol PeP 550 polyether tetrol of 500 molecular weight (BASF. Wyandotte Corporation, Parsippany, N.J.) and 22.7 parts Voranol 230-660 (a polyether triol of 85.4 equivalent weight (Dow Chemical Co.) and 30.0 parts Hydrite RH (hydrated aluminum silicate from Georgia Kaolin Company, Inc., N.J.) to a reactor fitted with a lid, stirrer and degassing outlet.

The mixture was thoroughly dehydrated by heating at 100°±5° C. (212°±10° F.) under vacuum. The temperature was then lowered to 45°±5° C. (113°±10° F.) at which point the combination of 7.63 parts Jeffamine D-230 polyoxypropylene diamine (Texaco, Inc., N.Y.) and 5.90 parts Ethacure 100 diethyltoluene diamine (Ethyl Corporation, Baton Rouge, La.) and 0.15 parts DABCO 125 dibutyltin diisooctylmaleate catalyst (Air Products, Allentown, Pa.) were charged. Agitation and vacuum were resumed for 15 minutes to degas the curative. The curative had a viscosity of 11,000±3000 centipoise at 25° C.

EXAMPLE 2

The following Example 2 illustrates the use of adhesive containinq the curative on FRP substrates.

Three inch by one inch pieces of GenCorp GC-7113 FRP substrate were wiped clean with a paper tissue. Lap shear samples having bonded areas of 1"×1"×0.030" were prepared by blending prepolymer with a curative in a prepolymer: curative weight ratio of 4.0:1.0 (Equivalents curative/equivalents prepolymer of 0.91). Samples were postcured at 240° F. (116° C.) for one hour. Samples were conditioned in an oven at 82° C. for 15 minutes before testing on an Instron machine at 0.5"/min. crosshead speed (ASTM method D1002).

In the following tables the failure mode of lap shear samples after testing was rated according to the degree of:

Delamination (DL) which means tearing of the surface of the substrate without exposure of the adhesive, and Adhesive failure (AF) which means separation of the adhesive from the substrate without any damage to the surface of the substrate.

The strongest adhesives and most desirable adhesives are those which demonstrate open times of 20 to 40 minutes, minimal sag, high bond strengths and 100% substrate delamination in the lap shear test at 180° F.

The following Table 1 shows the results obtained when various aliphatic diamines were used in curatives cured at 300° F. for 30 minutes.

TABLE 1

EVALUATION OF LIQUID AMINES
Dry Kimwipe Wipe
Postbake at 300° F./30 minutes

|  | −2 | −3 | −4 | −5 | −6 | −8 |
|---|---|---|---|---|---|---|
| Example A Prepolymer, g | 35.00 | 35.00 | 35.00 | 35.00 | 35.00 | 35.00 |
| Curative Masterbatch C4778-138-1*, g | 7.05 | 7.05 | 7.05 | 7.05 | 7.05 | 7.05 |
| Diethyltoluene Diamine (DETDA), g | 0.47 | | | | | |
| m-Xylylene Diamine (MXDA), g | | 0.36 | | | | |
| Isophorone Diamine (IPDA), g | | | 0.44 | | | |
| 1,3-Bis (aminomethyl)cyclohexane (1,3-BAC), g | | | | 0.37 | | |
| Bis(p-aminocyclohexyl)methane (PACM-20), g | | | | | 0.55 | |
| Jeffamine D-230, g | | | | | | 0.60 |
| Open Time, Minutes | 6 | 15 | 16 | ~13 | 16 | 16 |
| Degree of Cure | ←not fully cured (tacky)→ | | | | | |

*Pep 550    6.46 pbw
Isonate 143L  0.14

TABLE 1-continued

EVALUATION OF LIQUID AMINES
Dry Kimwipe Wipe
Postbake at 300° F./30 minutes

|  |  | −2 | −3 | −4 | −5 | −6 | −8 |
|---|---|---|---|---|---|---|---|
| Aerosil 200 | 0.42 | | | | | | |
| DABCO 125 | 0.33 | | | | | | |
|  | 7.053 | | | | | | |

According to the tests reported in Table 1 the adhesives made using prepolymer and curatives containing aliphatic diamines did not cure fully even at 300° F.

The following Table 2 reports results obtained when, instead of an aliphatic diamine, an aromatic diamine is used in a curative.

According to the tests reported in Table 3 adhesives made using curatives combining fast reacting diamines and slow reacting diamines and cured at 240° F. for 30 minutes showed extensive and consistent substrate delamination at 180° F., and good non-sag properties. The following Table 4 shows more examples of combina-

TABLE 2

ADHESION PERFORMANCE OF DETDA CURATIVE

| Adhesive Formulation | | | Adhesion Performance | |
|---|---|---|---|---|
| | | | 213-1 | 213-2 |
| Prepolymer Example A | | Prepolymer/Curative Mix Ratio (wt) | 4.10/1.00 | 3.65/1.00 |
| | | Postbake, °F./min. | 240/30 | 240/30 |
| | | Substrate | GC7113 | GC7113 |
| | | Open Time, min. | ~4 | ~3 |
| | | Bead Sag, in. | 0.5 | 0.35 |
| Curative 201-2 | | Lap Shear, psi (% DL) @180° F. | | |
| PEP 550 | 33.30 pbw | | 470 (100%) | 410 (100%) |
| Voranol 230–660 | 25.59 | | 440 (100%) | 410 (100%) |
| Stan Tone 6783 | 0.50 | | 445 (100%) | 430 (100%) |
| Hydrite RH | 26.62 | | 370 (100%) | 440 (98%) |
| Molec Sieves 5A | 4.99 | | 410 (98%) | 420 (100%) |
| DETDA | 8.89 | | 410 (100%) | 390 (90%) |
| DABCO 131 | 0.10 | | 420 (100%) | 390 (90%) |
| | 99.99 | | | |
| Brookfield Viscosity 31,500 cps @72° F. | | | | |

According to the tests reported in Table 2 the adhesives made using prepolymer and curatives containing aromatic diamine cured at 240° F. (116° C.) in 30 minutes but showed marginally acceptable bead sag of about 0.5 inch. The open time was not sufficient.

The following Table 3 reports the surprising results observed when a combination of slow reacting diamine and fast reacting diamine was used in the curative.

tions of a fast diamine, [isophoronediamine (IPDA)], and different slow diamines such as primary aromatic diamines DETDA, Ethacure 300 and Lonzacure M-CDEA, the aromatic secondary diamine UNILINK 4100 and the sterically hindered aliphatic diamine menthanediamine (MNDA).

TABLE 3

CURATIVE FORMULATIONS AND ADHESION PERFORMANCE WHEN MIXED WITH PREPOLYMER EXAMPLE A

| | 346 | 350 | 373 | 478 |
|---|---|---|---|---|
| PEP 550, eq. | 0.34 | 0.40 | 0.40 | 0.43 |
| Voranol 230–660, eq. | 0.34 | 0.40 | 0.40 | 0.42 |
| Ethacure 300[1], eq. | 0.18 | | | |
| DETDA[2], eq. | | 0.10 | 0.10 | 0.10 |
| Jeffamine[3] D-230, EQ. | 0.14 | 0.10 | 0.10 | 0.05 |
| Hydrite RH, % | 30.0 | 30.0 | 30.0 | 30.0 |
| DABCO 125, % | 0.15 | 0.15 | none | none |
| Prepolymer/Curative Mix Ratio by wt. | 3.76/1.00 | 3.84/1.00 | 3.84/1.00 | 3.84/1.00 |
| Adhesion Performance[4]: | 360 | 358 | 483 | 488 |
| Open Time, min. | 25–30 | 20–25 | 30 | >45 |
| Bead Sag, inch | 0.06 | 0.12 | 0.10 | 0.37 |
| Lap Shear Adhesion psi @180° F. | 550 (100% DL) | 410 (100% DL) | 540 (100% DL) | 550 (100% DL) |
| | 520 (100% DL) | 410 (100% DL) | 550 (100% DL) | 500 (100% DL) |
| | 500 (100% DL) | 400 (100% DL) | 490 (100% DL) | 460 (100% DL) |
| | 470 (100% DL) | 420 (100% DL) | 540 (100% DL) | 500 (100% DL) |

[1] dimethylthiotoluene diamine
[2] diethyltoluene diamine
[3] polyoxypropylene diamine
[4] postbake of adhesives at 240° F./60 min; substrate GC7113

TABLE 4

LOW TEMPERATURE POSTBAKE (250° F./60 min) CURATIVES BASED ON COMBINATIONS OF DIAMINES

| Curative | 710 | | 848 | | 892 | | 890 | | 889 | |
|---|---|---|---|---|---|---|---|---|---|---|
| PeP 550, eq. | 0.42 | | 0.43 | | 0.43 | | 0.43 | | 0.43 | |
| Voranol 230–660, eq. | 0.40 | | 0.40 | | 0.40 | | 0.40 | | 0.40 | |
| IPDA, eq. | 0.10 | | 0.09 | | 0.09 | | 0.09 | | 0.09 | |
| DETDA, eq. | 0.08 | | | | | | | | | |
| Unilink 4100, eq. | | | 0.08 | | | | | | | |
| Ethacure 300, eq. | | | | | 0.08 | | | | | |
| Lonzacure M-CDEA, eq. | | | | | | | 0.08 | | | |
| Menthane-diamine (MNDA), eq. | | | | | | | | | 0.08 | |
| Mistron RCS, % | 30.0 | | 30.0 | | 30.0 | | 30.0 | | 30.0 | |
| Polycat 41, % | 0.75 | | 0.65 | | 0.65 | | 0.65 | | 0.65 | |
| Brookfield Viscosity @ °F., cps | 16,200 @ 75 | | 11,000 @ 79 | | 15,100 @ 77 | | 24,000 @ 75 | | 15,100 @ 75 | |
| CURE (Prepolymer Example A) | 712 | 712-1* | 850 | 850-1 | 906-1 | 906-2 | 897-1 | 897-2 | 896-1 | 896-2 |
| Prepolymer/Curative Mix Ratio, (wt) | 4.1/1.0 | 4.1/1.0 | 3.9/1.0 | 3.6/1.0 | 3.9/1.0 | 3.6/1.0 | 3.7/1.0 | 3.4/1.0 | 4.0/1.0 | 3.6/1.0 |
| Open Time, min | 6–7 | 6–8 | 14 | ~13 | 12 | 6 | <5 | <8 | <15 | 5 |
| Button Sag, inch | 0.27 | 0.12 | 0.5 | 0.3 | 0.3 | 0.2 | 0.25 | 0.2 | 0.2 | 0.15 |
| Lap Shear @ 180° F., psi (% DL) | | | | | | | | | | |
| GC7113 @ 73–74° F. 30–50% Relative Humidity | 470(98%) 510(95%) 550(85%) 550(98%) | 500(90%) 540(97%) 440(99%) 450(97%) | 430(90%) 470(85%) 420(95%) 410(85%) | 480(98%) 480(100%) 430(100%) 350(100%) | 420(98%) 420(88%) 400(95%) 460(95%) | 410(97%) 420(98%) 450(98%) 440(95%) | 450(100%) 390(50%) 450(85%) 450(85%) | 570(100%) 560(98%) 630(85%) 450(100%) | 340(85%) 370(95%) 300(98%) 420(40%) | 330(98%) 350(93%) 380(90%) 400(80%) |
| GC7113 @ 90° F. 90% Relative Humidity | 540(99%) 500(99%) 470(98%) 500(98%) | 500(70%) 650(98%) 510(100%) 540(100%) | 520(98%) 450(100%) 480(100%) 440(100%) | 500(97%) 430(100%) 400(100%) 450(96%) | 390(90%) 370(50%) 400(95%) 380(97%) | 380(95%) 390(95%) 400(95%) 360(98%) | 370(100%) 450(100%) 470(100%) 480(98%) | 370(85%) 390(97%) 420(100%) 460(100%) | 280(AF) 240(AF) | 240(AF) 250(AF) |

*MONDUR MR polyisocyanate was used in prepolymer in place of MONDUR MRS in Prepolymer Example A According to the tests reported in Table 4, these adhesives showed good open time, good sag resistance and extensive and consistent substrate delamination measured at 180° F.

The following Table 5 reports more results observed when the combination of the aromatic diamine diethyl toluene diamine and the cycloaliphatic diamine piperazine was used in a curative.

TABLE 5

| Aromatic Diamine and Cycloaliphatic Diamine | | | |
|---|---|---|---|
| Adhesive: Prepolymer Example B | | | |
| Curative | PeP 550 | 84.20 pbw | |
| | Isonate 143L* | 1.95 | |
| | Aerosil 200 | 5.47 | |
| | Stan Tone 6783 | 0.42 | |
| | Piperazine | 3.33 | |
| | DETDA | 4.00 | |
| | Dabco 125 | 0.23 | |
| | Polycat 41 | 0.40 | |
| | | 100.00 | |
| Brookfield Viscosity | 8000–2800 cps @77° F. | | |
| CURE | 947-1 | 947-2 | 947-3 |
| Prepolymer/Curative Mix Ratio (wt) | 4.8/1.0 | 4.6/1.0 | 4.3/1.0 |
| Open Time, min. | 24 | 23 | 19 |
| Button Sag, inch | 0.11 | 0.09 | 0.09 |
| lap Shear @180° F., psi (% DL/AF): | | | |
| GC7113 @90° F./ 99% RH; | 390 (80/20) 380 (60/40) 370 (75/25) | 380 (95/5) 390 (70/30) 380 (98/2) | 300 (75/25) 330 (90/10) 350 (85/15) |

TABLE 5-continued

| Aromatic Diamine and Cycloaliphatic Diamine | | |
|---|---|---|
| GC7113 @74° F./ 45% RH | 390 (50/50) 440 (75/25) 500 (90/10) 450 (98/2) 460 (70/30) | 360 (95/5) 380 (80/20) 330 (75/25) 370 (85/15) 340 (70/30) | 330 (60/40) 370 (60/40) 370 (5/95) 360 (30/70) 370 (98/2) |

*The Isonate isocyanate is reacted with the PeP polyol before adding the remaining ingredients According to the tests reported in Table 5, these adhesives showed very desirable 19–24 minutes open time, excellent sag resistance and substrate delamination at 180° F.

I claim:

1. A curative component for a two component primerless structural urethane adhesive curable at 240° F. (116° C.) and demonstrating good sag resistance, said curative comprising a mixture of: a polyol and a combination of
   (A) slow reacting diamine selected from the group of primary and secondary aromatic diamines and polyamines and primary and secondary sterically hindered diamines and polyamines and mixtures thereof and
   (B) a fast reacting diamine selected from the group of primary and secondary aliphatic and primary and secondary cycloaliphatic diamines and polyamines and mixtures thereof.

2. The curative of claim 1 wherein said combination is from 0.02 to 0.18 equivalent per equivalent of curative of said slow reacting diamine and from 0.04 to 0.14 equivalent per equivalent of curative of said fast reacting diamine.

3. The curative of claim 2 wherein said slow reacting diamine is diethyl toluene diamine or di(methylthio)toluene diamine.

4. The curative of claim 3 wherein said slow reacting diamine is diethyl toluene diamine.

5. The curative of claim 2 wherein said fast reacting diamine is isophorone diamine o piperazine.

6. The curative of claim 5 wherein said fast reacting diamine is piperazine.

7. The curative of claim 2 wherein said slow reacting diamine is diethyl toluene diamine and said fast reacting diamine is piperazine.

8. A method of laminating a first fiberglass reinforced sheet molding compound substrate and a second substrate comprising the steps of:
   (A) applying to said first substrate an adhesive prepared by mixing
       (1) an isocyanate terminated prepolymer and
       (2) a curative comprising a polyol and the combination of a slow reacting diamine or polyamine selected from primary and secondary aromatic diamines and polyamines and sterically hindered diamines and polyamines and mixtures thereof and a fast reacting diamine selected from the group of primary and secondary aliphatic diamines and polyamines and primary and secondary cycloaliphatic diamines and polyamines and mixtures thereof,
   (B) affixing said second substrate, and
   (C.) curing said laminate.

9. The method of claim 8 wherein said curative comprises a polyol and the combination of from 0.02 to 0.18 equivalent per equivalent of curative of said slow reacting diamine or polyamine and from 0.04 to 0.14 equivalent per equivalent of curative of said fast reacting diamine or polyamine.

10. The method of claim 9 wherein said slow reacting diamine is diethyl toluene diamine or di(methylthio)toluene diamine.

11. The method of claim 9 wherein said slow reacting diamine is diethyl toluene diamine.

12. The method of claim 9 wherein said fast reacting diamine is isophorone diamine or piperazine.

13. The method of claim 9 wherein said fast reacting diamine is piperazine.

14. The method of claim 9 wherein said slow reacting diamine is diethyl toluene diamine and said fast reacting diamine is piperazine.

15. The method of claim 9 wherein the ratio of equivalents of isocyanate groups in said prepolymer to equivalents of active hydrogen groups in said curative is from 1.0:1.0 to 1.4:1.0.

16. The method of claim 9 wherein said curing step is at 240° F. (116° C.).

17. The method of claim 9 wherein said first substrate is cleaned before applying said adhesive.

18. A laminated composite comprising a first unprimed fiber reinforced polyester substrate having a second substrate adhesively bound thereto by the cured residue of an adhesive comprising a blend of a prepolymer component comprising the reaction product of a polyol and an aromatic isocyanate and having 3 to 15 percent free isocyanate groups, and a curative component comprising a polyfunctional polyether polyol and the combination of (A) a slow reacting diamine or polyamine selected from the group of primary and secondary aromatic diamines and polyamines and primary and secondary sterically hindered diamines and polyamines and mixtures thereof, and (B) a fast reacting diamine or polyamine selected from the group of primary and secondary aliphatic diamines and polyamines, primary and secondary cycloaliphatic diamines and polyamines and mixtures thereof.

19. The composite of claim 18 wherein said combination of diamines is from 0.02 to 0.18 equivalent per equivalent of curative of said slow reacting diamine!or polyamine, and from 0.04 to 0.14 equivalent per equivalent of curative of said fast reacting diamine or polyamine.

20. The composite of claim 18 wherein said slow reacting diamine is diethyl toluene diamine or di(methylthio)toluene diamine.

21. The composite of claim 18 wherein said slow reacting diamine is diethyl toluene diamine.

22. The composite of claim 18 wherein said fast reacting diamine is isophorone diamine or piperazine.

23. The composite of claim 18 wherein said fast reacting diamine is piperazine.

24. The composite of claim 18 wherein said slow reacting diamine is diethyl toluene diamine and said fast reacting diamine is piperazine.

25. The composite of claim 18 wherein the ratio of equivalents of isocyanate groups in said prepolymer to equivalents of active hydrogen groups in said curative is from 1.0:1.0 to 1.4:1.0.

26. The composite of claim 18 wherein said adhesive was cured at 240° F. (116° C.).

* * * * *